(12) United States Patent
Junge et al.

(10) Patent No.: US 11,905,579 B1
(45) Date of Patent: Feb. 20, 2024

(54) SHEET STEEL HAVING A DETERMINISTIC SURFACE STRUCTURE

(71) Applicant: ThyssenKrupp Steel Europe AG, Duisburg (DE)

(72) Inventors: Fabian Junge, Düsseldorf (DE); Burak William Cetinkaya, Dortmund (DE); Gregor Müller, Moers (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 17/763,308

(22) PCT Filed: Sep. 22, 2020

(86) PCT No.: PCT/SE2020/076422
§ 371 (c)(1),
(2) Date: Mar. 24, 2022

(87) PCT Pub. No.: WO2021/063751
PCT Pub. Date: Apr. 8, 2021

(30) Foreign Application Priority Data

Sep. 30, 2019 (DE) .......................... 102019215051.9

(51) Int. Cl.
*C22C 18/04* (2006.01)
*C21D 7/04* (2006.01)
(Continued)

(52) U.S. Cl.
CPC ................ *C22C 18/04* (2013.01); *B21B 1/22* (2013.01); *B21B 1/227* (2013.01); *B21B 27/005* (2013.01);
(Continued)

(58) Field of Classification Search
CPC . B21B 2261/14; B21B 2001/228; B21B 1/22; B21B 1/227; B21B 27/005; B21B 27/02; B21B 27/021; B21B 2263/02; C25D 3/22; C25D 7/0614; B32B 15/013; B32B 15/012; B32B 15/04; B32B 15/043; B32B 15/08; B32B 15/18; B32B 3/02; B32B 3/26; B32B 3/263; B32B 3/30; C21D 7/04; C21D 9/48; C21D 9/46; C21D 2221/00;
(Continued)

(56) References Cited

U.S. PATENT DOCUMENTS

2011/0111255 A1 5/2011 Diez et al.
2011/0165430 A1 7/2011 Hesse et al.
(Continued)

FOREIGN PATENT DOCUMENTS

DE 102012017703 A1 3/2014
DE 102019214133 A1 3/2021
(Continued)

OTHER PUBLICATIONS

DIN EN 1669—Aluminum and aluminum alloys—Test methods—Earing test for sheet and strip—Feb. 1997.
(Continued)

*Primary Examiner* — Michael E. La Villa
(74) *Attorney, Agent, or Firm* — RMCK Law Group PLC

(57) ABSTRACT

The invention relates to a sheet steel (1) coated with a zinc-based coating and skin-pass rolled with a deterministic surface structure (2), and to a method for producing it.

17 Claims, 2 Drawing Sheets

(51) Int. Cl.
| | |
|---|---|
| B32B 15/04 | (2006.01) |
| C23C 30/00 | (2006.01) |
| B21B 27/00 | (2006.01) |
| B21B 1/22 | (2006.01) |
| B21B 27/02 | (2006.01) |
| B32B 15/01 | (2006.01) |
| C25D 3/22 | (2006.01) |
| C25D 7/06 | (2006.01) |
| B32B 15/18 | (2006.01) |
| B32B 3/26 | (2006.01) |
| B32B 15/08 | (2006.01) |
| B32B 3/30 | (2006.01) |
| B32B 3/02 | (2006.01) |
| C21D 9/48 | (2006.01) |
| C23C 2/06 | (2006.01) |
| C23C 2/36 | (2006.01) |
| C23C 2/40 | (2006.01) |
| C23C 2/02 | (2006.01) |
| C23C 28/02 | (2006.01) |
| C23C 2/04 | (2006.01) |
| C21D 9/46 | (2006.01) |
| C23C 2/26 | (2006.01) |
| C22C 18/00 | (2006.01) |

(52) U.S. Cl.
 CPC ............ *B21B 27/02* (2013.01); *B21B 27/021* (2013.01); *B32B 3/02* (2013.01); *B32B 3/26* (2013.01); *B32B 3/263* (2013.01); *B32B 3/30* (2013.01); *B32B 15/012* (2013.01); *B32B 15/013* (2013.01); *B32B 15/04* (2013.01); *B32B 15/043* (2013.01); *B32B 15/08* (2013.01); *B32B 15/18* (2013.01); *C21D 7/04* (2013.01); *C21D 9/46* (2013.01); *C21D 9/48* (2013.01); *C22C 18/00* (2013.01); *C23C 2/02* (2013.01); *C23C 2/04* (2013.01); *C23C 2/06* (2013.01); *C23C 2/26* (2013.01); *C23C 2/36* (2013.01); *C23C 2/40* (2013.01); *C23C 28/021* (2013.01); *C23C 28/025* (2013.01); *C23C 30/00* (2013.01); *C23C 30/005* (2013.01); *C25D 3/22* (2013.01); *C25D 7/0614* (2013.01); *B21B 2001/228* (2013.01); *B21B 2261/14* (2013.01); *B21B 2263/02* (2013.01); *C21D 2221/00* (2013.01); *Y10T 428/12229* (2015.01); *Y10T 428/12354* (2015.01); *Y10T 428/12389* (2015.01); *Y10T 428/12396* (2015.01); *Y10T 428/12438* (2015.01); *Y10T 428/12458* (2015.01); *Y10T 428/12556* (2015.01); *Y10T 428/12569* (2015.01); *Y10T 428/12799* (2015.01); *Y10T 428/12979* (2015.01); *Y10T 428/12993* (2015.01); *Y10T 428/2495* (2015.01); *Y10T 428/24967* (2015.01); *Y10T 428/26* (2015.01); *Y10T 428/27* (2015.01); *Y10T 428/273* (2015.01)

(58) Field of Classification Search
 CPC ........... C22C 18/04; C22C 18/00; C23C 2/06; C23C 2/26; C23C 2/40; C23C 2/02; C23C 2/04; C23C 2/36; C23C 28/021; C23C 28/025; C23C 30/00; C23C 30/005; Y10T 428/2495; Y10T 428/24967; Y10T 428/27; Y10T 428/273; Y10T 428/12799; Y10T 428/12972; Y10T 428/12979; Y10T 428/12993; Y10T 428/12569; Y10T 428/12229; Y10T 428/12556; Y10T 428/12389; Y10T 428/12396; Y10T 428/12438; Y10T 428/12354; Y10T 428/12458; Y10T 428/26
 See application file for complete search history.

(56) References Cited

U.S. PATENT DOCUMENTS

| | | | |
|---|---|---|---|
| 2015/0209848 | A1 | 7/2015 | Kopplin et al. |
| 2016/0160357 | A1* | 6/2016 | Riener .................... C23C 22/34 427/343 |

FOREIGN PATENT DOCUMENTS

| | | |
|---|---|---|
| DE | 102019214135 A1 | 3/2021 |
| EP | 2119804 A1 | 11/2009 |
| EP | 2006037 B1 | 8/2010 |
| EP | 2892663 A1 | 7/2015 |
| WO | 2014032779 A1 | 3/2014 |
| WO | 2014037545 A1 | 3/2014 |

OTHER PUBLICATIONS

International Search Report and Written Opinion for International Application No. PCT/EP2020/076422 dated Jan. 12, 2021.

* cited by examiner

US 11,905,579 B1

SHEET STEEL HAVING A DETERMINISTIC SURFACE STRUCTURE

CROSS REFERENCE TO RELATED APPLICATIONS

This application is a 371 U.S. National Stage of International Application No. PCT/EP2020/076422, filed Sep. 22, 2020, which claims the benefit of German Patent Application No. 10 2019 215 051.9 filed Sep. 30, 2019. The disclosures of each of the above applications are incorporated herein by reference in their entirety.

FIELD

The invention relates to a sheet steel coated with a zinc-based coating and skin-pass rolled with a deterministic surface structure. The invention further relates to a method for producing a sheet steel coated with a zinc-based coating and skin-pass rolled with a determinist surface structure.

BACKGROUND AND SUMMARY

For decades now automakers have used sheet metal materials, more particularly of steel. The sheet metal materials are provided in the form, in particular, of flat products and are processed further by means, for example, of processes of sheet metal forming, such as deep drawing, for example. The forces introduced into the sheet metal material in the course of these processes are transmitted via the sheet metal surface into the deep-drawn part. The local stresses on the sheet metal surface therefore come about as a result of factors including the geometry of the component and the frictional forces that arise in the operation. These local stresses on a surface element under consideration, which are made up of normal forces and shearing forces, may undergo considerable alterations in the course of the forming operation. For an optimum forming outcome it is necessary to be able to exert targeted control over the flow of material during the forming operation. As well as by adapting the sheet metal blank, this may be accomplished, for example, by (additional) oiling, in order to achieve local reductions in the frictional forces and hence in the retaining forces. Increasing the retaining forces may be realized, for example, through the use of draw beads.

The deployment of (additional) oiling constitutes a considerable additional outlay. To start with, the application of the (additional) oiling is a costly and inconvenient procedure, and, furthermore, the cleaning outlay increases both for the component and in the forming operation, as the quantities of oil introduced may well adversely affect operational stability. Particularly in the light of an environmentally friendly manufacture, the increased deployment of lubricants is viewed critically.

The wettability of the sheet metal material, both by aqueous media and for lubricants relevant to the forming operation, is not only dependent on the sheet metal topography. The local wettability is also influenced by the prevailing surface chemistry. The sheet metal material may be uncoated or may have been coated with a metallic coating, applied primarily for reasons of corrosion control, and a distinction is to be made between uncoated and coated, especially galvanized, sheet metal materials. The galvanized sheet metal materials can be subdivided, additionally, into electrogalvanized and hot-dip galvanized sheet metal materials.

Textured skin-pass rolls transfer their texture, during a skin-pass procedure, to the surface of the sheet metal materials being processed, in the form of a negative—that is, elevations on the roll surface result in valleys in the sheet metal surface, and vice versa. The depressions introduced into the sheet metal surface in this way, referred to as closed empty volumes, serve as lubricant pockets, which are able to hold a lubricant applied to the sheet metal surface and carry it with them during the forming operation. From the prior art, sheet steels skin-pass rolled with a stochastic surface structure are known, illustratively, from patent specification EP 2 006 037 B1, and sheet steels skin-pass rolled with a deterministic surface structure are known, illustratively, from patent specification EP 2 892 663 B1.

Electrogalvanized sheet metal materials are skin-pass rolled before being galvanized, whereas hot-dipped galvanized sheet metal materials are skin-pass rolled after they have been galvanized.

In the course of the skin-pass rolling, there is contact between the shaping elements of the skin-pass roll and the sheet metal surface, and this contact may alter the surface chemistry of the contact area. In terms of their chemistry, hot-dip galvanized coatings have a construction such that a layer of alloy elements with more oxygen affinity is formed on the zinc located primarily in the coating. The mechanical stress involved in skin-pass rolling may cause the zinc, rather than the alloy elements, such as magnesium or aluminum, for example, to become exposed at the contact points between skin-pass roll and sheet metal material. Internal studies have shown that hot-dip galvanized sheet metal materials which have been skin-pass rolled with a stochastic surface structure have a different surface chemistry in the skin-pass impressions (valley regions) of the coated sheet metal material than on the elevations (peak regions) of the coated sheet metal material. While the chemical composition in the valley regions is more zinc-rich, the peak regions feature high fractions of the alloy elements with oxygen affinity (Al, Mg, etc.).

The internal studies additionally showed that there is a lack of uniformity and of control in the contact between skin-pass roll surface and sheet metal surface and in the associated change in the surface chemistry within a skin-pass impression in the case of a stochastic surface texture. As a result of this lack of uniformity, process media such as forming oils are distributed unevenly in the valley regions. In order to ensure that such lubricants reach the locations relevant to the forming operation—the contact area between shaping (forming) tool and sheet metal material—it is a standard requirement, after skin-pass rolling, to apply more lubricant than strictly necessary for the forming operation.

The cleaning of sheet metal materials coated as standard with lubricant and skin-pass rolled with a stochastic surface texture also presents great challenges to the processing plants in terms of process, environmental protection and workplace safety. In the case of complex component geometries, moreover, additional oiling may often be necessary on the user side, this entailing considerable extra outlay and costs. Furthermore, these additional process media must be cleaned off again in the course of further processing, in the form of phosphating and painting operations, and this entails a considerable burden on the environment and on the staff working in the plants.

By means of a laser texturing process—cf. EP 2 892 663 B1—a skin-pass roll having a deterministic texture can be produced, its surface possessing a defined material ratio. The material ratio of the skin-pass roll indicates the proportion by area of the shaping elements in relation to the area of the existing depressions on the surface of the textured skin-pass roll. A higher material ratio on the part of the skin-pass roll means that, during skin-pass rolling, there is an increase in the contact area between sheet metal material and skin-pass roll and accordingly a plurality of and/or larger skin-pass impressions (valley regions) are formed on the surface of the coated sheet metal material. Internal studies have shown that by virtue of a higher material ratio, it is possible to modify the surface chemistry in the case of hot-dip galvanized coatings at a plurality of points through the contact of the sheet metal material with the shaping elements of the skin-pass roll. This modification to the material ratio may bring with it positive consequences for the forming properties of the sheet metal material.

The object is therefore to provide a sheet steel coated with a zinc-based coating and skin-pass rolled with a deterministic surface structure, this sheet steel having an improved wetting property that allows the use of process media to be reduced.

The object is achieved with the features of the instant disclosure.

The provision of a deterministic surface structure on a skin-pass roll sheet steel coated with a zinc-based coating is essential for further operations, particularly in the industry carrying out further processing in order to produce components for automobiles. In component production, more particularly in forming operations, it is advantageous if process media that are used, such as oil and/or lubricants, for example, are present evenly and in necessary surface weights at locations relevant to the forming operation. These locations relevant to the forming operation are generally the contact areas between sheet steel and shaping tools—accordingly, not the impressions (valley regions) in the sheet steels in which the process media preferentially collect, but rather the surface in the form of the face of the elevations (peak regions) on the sheet steels.

The inventors have found that for a sheet steel coated with a zinc-based coating and skin-pass rolled with a deterministic surface structure, it is possible to provide, by a comparison with the prior art, an improved wetting property, thereby enabling a reduction in the usage of process media, by establishing a targeted alteration or improved design of the surface chemistry on the surface in the valley regions of the sheet steels coated with a zinc-based coating and skin-pass rolled with a deterministic surface structure. Process media are able to spread more effectively on a readily wettable surface within the valley regions, until they are held, because of the acting capillary forces, in the flank regions and optionally at the transitions between the valley regions and flank regions of the surface structure.

The sheet steel is coated with a zinc-based coating, applied by hot-dip coating, with the coating comprising not only zinc and unavoidable impurities but also additional elements such as aluminum with an amount of 0.1 up to 5 wt% and magnesium with an amount of 0.1 up to 5 wt% in the coating.

Sheet steels with a zinc-based coating afford very good cathodic corrosion control, which has been used for years in automaking. Where improved corrosion control is intended, the coating comprises magnesium with an amount of at least 0.3 wt%, more particularly at least 0.6 wt%, preferably at least 0.9 wt%. Aluminum may be present with an amount of at least 0.3 wt%, in order in particular to improve attachment of coating to the sheet steel and in particular to prevent, substantially, diffusion of iron from the sheet steel into the coating if the coated sheet steel undergoes heat treatment, so that the positive corrosion properties are retained. The thickness of the coating here may be between 1 and 15 µm, more particularly between 2 and 12 µm, preferably between 3 and 10 µm. Below the minimum limit, sufficient cathodic corrosion control may not be ensured, and above the maximum limit, there may be joining problems when the sheet steel of the invention or a component fabricated from it is joined to another component. In particular, if the specified maximum limit on the thickness of the coating is exceeded, a stable operation during thermal joining or welding may not be ensured. In the hot-dip coating, the sheet steels are first coated with a corresponding coating and then supplied to skin-pass rolling.

Owing to presence of the alloy elements Al and Mg with oxygen affinity, in each case at not less than 0.1 wt%, in the zinc-based coating, aluminum oxides and magnesium oxides are formed on the surface of the coating or near to the surface. A magnesium-rich oxide layer, in particular, is formed on the surface of the coating. This magnesium-rich oxide layer possesses hydrophobic wetting properties, and so aqueous media do not uniformly wet the surface of the coated sheet steel, and contract. Oils and lubricants, conversely, spread on hydrophobic surfaces of this kind, and are attracted. Immediately below the magnesium-rich oxide layer are the elements aluminum and zinc. Oxide layers may substantially adversely affect the wetting behavior, and magnesium oxides have poorer wetting behavior by comparison with aluminum oxides. Wettability studies were conducted internally using a process medium from Fuchs with the designation "ANTICORIT PL 3802 39 S", and it was found that this process medium wets better on aluminum oxides than on magnesium oxides. The wettability here is dependent on the proportions of the surface tensions involved, which via Young's equation are related to the contact angle which, accordingly, becomes a measure of the wettability. The smaller the contact angle, the greater the wettability. The contact angles for this process medium were determined at around 14° for $Al_2O_3$ and at around 19° for MgO.

The deterministic surface structure is therefore to be interpreted, and impressed into a sheet steel coated with a zinc-based coating, in such a way that the impressed valley regions have a substantially uniform surface chemistry which is different to that of the peak regions of the coated sheet steel. The fraction or ratio of peak regions, in which the alloy elements with oxygen affinity are located, to valley regions, in which the elements located below these, particularly zinc and optionally aluminum, are more prevalent can be adjusted in a targeted way. A different surface chemistry, particularly in the valley regions, is accompanied by a different surface energy and hence wettability.

Within skin-pass rolling, the contact between shaping elements of the surface of the skin-pass roll, established with a deterministic structure, and the surface of a sheet steel coated with a zinc-based coating provides a mechanical stress by means of which the elements located immediately beneath the magnesium-rich oxide layer, zinc and optionally aluminum (oxide), are able to reach the surface of the coating.

The sheet steel coated with a zinc-based coating and skin-pass rolled with a deterministic surface structure therefore has a surface which exhibits peak regions and valley regions, which are connected to one another via flank regions, the relative concentration of magnesium on the surface of the coating in the valley regions being lower than on the surface of the coating in the peak regions.

In particular the peak regions may be connected to one another substantially continuously, so that the peak regions form, so to speak, a continuous peak region, from which the valley regions and flank regions are impressed reciprocally on the surface of the coated sheet steel as a deterministic structure.

The targeted changing of the surface chemistry allows local wetting phenomena of process media to be controlled in a targeted way. Process media are attracted in the peak regions by the water-repellent and magnesium-rich oxide layers, with the hydrophobic process media collecting preferentially on the flank regions in the case of deterministic surface structures. The changing of the surface composition in the valley regions, in particular to give a less magnesium-rich concentration, ensures the conveying and/or distribution of the process medium to the locations advantageous for the forming operation—the flank regions of the surface structure.

The relative concentration of magnesium means the mass fraction of magnesium in the zinc-based coating, relative to a defined region on the surface. The valley regions can be differentiated unambiguously from the peak regions or the peak region, since the flank regions separate them from one another. Magnesium is present in metallic form and/or in oxidic form and/or in hydroxidic form and/or as magnesium carbonate. The relative concentration differences in terms of magnesium, aluminum, and zinc on the surface of the coating can be ascertained by recording the local distribution of the signals for these alloy elements by means of Time-of-Flight Secondary Ion Mass Spectrometry (ToF-SIMS) in imaging mode or, similarly, by means of Auger electron or photo electron spectroscopy. ToF-SIMS is an analytical method for determining the chemical surface composition of the topmost 1-3 monolayers.

Relative concentration differences determined by ToF-SIMS are measured by scanning the surface under analysis within a representative measurement area. At each position of the scan, a spectrum is recorded in the positive polarity and the raw signals are picked up for the main constituents (alloy elements). The relative concentration of the element X, which in this case represents one of the alloy elements located in the hot-dip-galvanized coating, is given by the ratio [X raw signal integral/(Zn raw signal integral+Mg raw signal integral+Al raw signal integral)], with the denominator of the ratio containing the sum of the raw signal-integrals of all the alloy elements located in the coating. In this definition, "raw signal" of the element X is the intensity or peak area of the element X in the mass spectrum, and "raw signal-integral" of the element X is the integrated intensity which is represented over a defined coherent area of scan positions and is assigned to the respective element X. The internal ToF-SIMS measurements were carried out by means of a TOF.SIMS 5 instrument from ION-TOF GmbH.

The relative concentration of zinc, aluminum, and magnesium is determined by determining the absolute concentration of these elements over a defined coherent error and then carrying out normalization to 100%; in this case, the sum of the concentration of zinc, aluminum, and magnesium is set at 100 and the fraction of the respective element is rated or weighted on the basis of this 100% as a relative concentration, in other words based on 100%. The relative concentration of an alloy element (Al, Mg, Zn) therefore relates to the sum of the concentrations of the three alloy elements Al, Mg, Zn, in that this sum represents 100%. Because the absolute concentration of the three alloy elements Al, Mg and Zn may vary from coating to coating, the invention reports the local relative concentration of the respective elements in the valley region by comparison with the peak region in percentage points, in order to give a precise definition of the changes between the two regions.

The relative concentration or the mass fraction of magnesium, based on the sum of all fractions of zinc, aluminum, and magnesium (in metallic and/or oxidic form and/or hydroxidic form and/or as magnesium carbonate) on the surface of the coating in the valley regions is at least 20% lower than in the peak regions, more particularly at least 40%, preferably at least 60%, more preferably at least 90%. The relative concentration may approach zero or else be below the detection limit of ToF-SIMS.

A deterministic surface structure is to be understood as referring to recurring surface structures which have a defined shape and/or configuration; cf. EP 2 892 663 B1. This also includes, in particular, surfaces having a (quasi-) stochastic appearance, which, however, are applied by means of a deterministic texturing method and which therefore are composed of deterministic shape elements.

Sheet steel refers generally to a flat steel product, which may be provided in sheet form or in blank form or in strip form.

The geometric configuration (size and depth) of a deterministic surface structure (negative shape) on a skin-passed sheet steel coated with a zinc-based coating is dependent in particular on how the corresponding geometric structure (positive shape) has been/is designed on a skin-pass roll. Laser texturing methods are preferably employed in order to be able to establish targeted structures (positive shape) on the surface of a skin-pass roll by removal of material. In particular, targeted activation of the energy, the pulse duration, and the selection of a suitable wavelength of a laser beam acting on the surface of the skin-pass roll can be used to exert a positive influence on the design of the structure(s). fs, ps, and ns pulses are all suitable for removal of material, but the nature of the incoupling of energy and of the removal on a solid surface is substantially different, as is the size of the heat-effected zone (HAZ). The shorter the pulse duration, the less the amount of energy which can flow, for example, from the laser focus into the surrounding zone (HAZ). The longer the pulse, the greater the extent to which the radiant energy will be coupled into the plasma which is already forming, or will be reflected from said plasma, and therefore cannot be coupled directly into the surface of the skin-pass roll. On the surface of the skin-pass roll, a pulse leaves behind a substantially circular crater, which reproduces—or which reproduce, when there are multiple craters—the surface or the area of the elevations on the sheet steel and hence the contact area between sheet steel and shaping tool, after the skin-pass rolling operation. Reducing the pulse duration affects the formation of a crater, and more particularly the diameter of the crater can be reduced. By reducing the pulse energy, particularly when using short-pulse or ultrashort-pulse lasers, it is possible to establish the geometric structure (positive shape) on the surface of a skin-pass roll in a targeted way. This is achieved, for example, if the pulse duration of the laser with which the surface of the skin-pass roll is textured is reduced in the direction of the removal threshold and accordingly the geometric structure can be generated with higher resolution on the skin-pass roll. A similar effect can be achieved by raising the beam profile quality ($M^2$) and the aperture of the ideally aspherical focusing optics. By virtue of the high resolution and/or low crater area, formed by the relatively low-energy interaction of laser and skin-pass roll, in particular, it is possible to establish rougher surfaces and any desired gradients (angles) of the flank region on the flank region in a targeted way.

Further advantageous embodiments and developments are apparent from the following description. One or more features from the claims, the description or else the drawing may be linked with one or more other features therefrom to form further embodiments of the invention. It is also possible for one or more features from the independent claims to be linked by one or more other features.

The zinc (oxide) and/or aluminum (oxide) elements lying immediately below the magnesium-rich oxide layer reach the surface because of the mechanical action, and accordingly, in one embodiment of the sheet steel of the invention, the relative concentration of zinc on the surface of the coating in the valley regions is greater than the relative concentration of zinc on the surface of the coating in the peak regions. The local relative concentration of zinc in the coating in the valley regions is at least 20% greater than the relative concentration of zinc on the surface of the coating in the peak regions, more particularly at least 30%, preferably at least 40%, more preferably at least 50%. The relative concentration of the zinc and/or of the aluminum on the surface of the coating may likewise be ascertained by evaluation of ToF-SIMS records.

According to one embodiment of the sheet steel of the invention, the surface structure comprises a flank region which is formed with an angle between 1° and 89° to the perpendicular of the sheet steel. The angle formed may more particularly be between 50° and 87°, preferably between 60° and 85°, more preferably between 65° and 82°. The valley and flank regions (negative shape) of the surface structure correspond essentially to the surface (positive shape) on a skin-pass roll, which forms or impresses the surface structure by a corresponding action on the sheet steel. The flank region forming the surface structure and running peripherally around it, together with the valley region connected in one piece to the flank region, defines a closed volume of the surface structure impressed into the sheet steel by means of skin-pass rolling. The closed volume, referred to as the empty volume, can be matched to a process medium for application, more particularly oil, for later processing by means of forming methods.

According to one embodiment of the sheet steel of the invention, the sheet steel has a material ratio of less than 50%, more particularly less than 40%, preferably less than 30%, more preferably less than 25%, very preferably less than 20%; but by virtue of the reduced material ratio, it is possible to reduce the amount of process-related process media while at the same time achieving good forming outcomes. The material ratio refers to the ratio of the areas of the peak regions or of the area of the peak region to the areas of the valley regions.

According to one embodiment of the sheet steel of the invention, the sheet steel has a factor F, which is the ratio of skin-pass rolled area (sum of all areas of the flank regions and valley regions) and the square of the area periphery (sum of all area peripheries, particularly the length of the edges, of the flank regions on the peak region that start from the peak region), the factor being greater than 1%, more particularly greater than 1.2%, preferably greater than 1.5%, more preferably greater than 2%. Improved forming outcomes may result from a suitable choice of the geometric dimensions of the region impressed during skin-pass rolling (circle, rectangle, etc.) and by a suitable choice of the area periphery of the skin-pass rolled region, which corresponds to the length of the edge and is dependent on the geometric dimensions.

According to one embodiment of the sheet steel of the invention, the sheet steel is additionally provided with a process medium, more particularly with an oil, and in particular the process medium is taken up in the surface structure with a surface weight of up to 2 g/m$^2$. On account of the dimensioning of the surface structure, there is only a small requirement for process medium, and so the surface weight can be limited to up to 1.6 g/m$^2$, more particularly up to 1.3 g/m$^2$, preferably up to 1 g/m$^2$, more preferably up to 0.6 g/m$^2$, with further preference up to 0.4 g/m$^2$. Because of the difference in surface composition, in particular, the process medium after being applied is deposited substantially in the flank regions and optionally at the transitions between the flank regions and valley regions of the surface structure, and is available for further operations, preferably for deep-drawing operations, closer to or adjacent to locations that are relevant to the forming operation, in order to improve the lubrication and reduce the friction and hence wear of the shaping means, such as shaping devices, for example, preferably (deep-drawing) presses. It is possible in particular to carry out effective suppression of deposition of the process medium at tribologically unfavorable regions which do not make a contribution to the supply of process medium to the actual zone of contact or of friction. The sheet steel of the invention, with little demand for process medium, therefore has very good tribological properties and, in comparison to the sheet steels known from the prior art, more particularly oiled sheet steels, is more eco-friendly, by virtue in particular of reduced use of resources.

According to a second aspect, the invention relates to a method for producing a sheet steel coated with a zinc-based coating and skin-pass rolled with a deterministic surface structure, comprising the following steps:

providing a sheet steel coated with a zinc-based coating, the coating, as well as zinc and unavoidable impurities, comprising additional elements such as aluminum with an amount of 0.1 up to 5 wt% and magnesium with an amount of 0.1 up to 5 wt% in the coating, skin-pass rolling the sheet steel with a skin-pass roll, where the surface of the skin-pass roll which acts on the surface of the sheet steel is furnished with a deterministic surface structure such that after the skin-pass rolling, the surface structure of the coated and rolled sheet steel has peak regions and valley regions which are connected to one another via flank regions, and the exposure to the skin-pass roll establishes a relative concentration of magnesium on the surface of the coating in the valley regions which is lower than on the surface of the coating in the peak regions.

Through the action of force on the surface of the sheet steel, the surface (positive shape) of the skin-pass roll forms a surface structure which defines a valley and flank region (negative shape) and corresponds substantially to the surface (positive shape) of the skin-pass roll. The skin-pass roll, for forming a deterministic surface structure, may be machined using suitable means, such as using lasers, for example; cf. also EP 2 892 663 B1. Furthermore, other methods of removal of material may be used for establishing a surface on a skin-pass roll, examples being machining methods with geometrically defined or undefined cutting, chemical or electrochemical methods, optical or plasma-induced methods.

The defined surface structure of a deterministically configured texture on the surface of a skin-pass roll enables the alloy elements with oxygen affinity in the zinc-based coating, such as magnesium and aluminum, to be substantially displaced on the surface of the coating by the action of force during the skin-pass rolling. Since magnesium has more oxygen affinity than aluminum, a magnesium-rich oxide layer is formed on the surface in the coating, or near to the surface, particularly in the course of the hot-dip coating operation. Through the action of force it is possible in particular, in a targeted way, to carry out substantial displacement of interfering layers, such as the magnesium-rich oxide layers, for example, and so zinc and optionally aluminum increase in the valley regions in their relative concentration on the surface, thereby enabling improved wettability to be ensured.

In order to avoid repetition, reference is made in each case to the observations regarding the sheet steel of the invention skin-pass rolled with a deterministic surface structure.

In order in particular to reduce the relative concentration of magnesium on the surface of the coating in the valley regions, and, respectively, to displace the magnesium-rich oxide layer, one embodiment of the method of the invention uses a degree of skin-pass rolling of at least 0.5%, and so a positive influence can be exerted on the reduction in magnesium on the surface of the coating in the valley regions, owing to the targeted action of force. A further reduction is possible if the degree of the skin-pass rolling is, in particular, at least 0.8%, preferably at least 1.0%, more preferably at least 1.2%. The degree of skin-pass rolling is an expression of the ratio of the decrease in thickness (incoming thickness to outgoing thickness in the skin-pass rolling frame) of the skin-pass-rolled sheet steel to the incoming thickness. Degrees of skin-pass rolling of more than 2.5% bring no advantage and only increase personnel and/or the apparatus involved, and so the degree of skin-pass rolling is limited in particular to not more than 2.2%, preferably to not more than 2%. Moreover, an increase in the degree of skin-pass rolling is accompanied by an increase in the wear or abrasion generated in the course of skin-pass rolling, owing to the shearing forces between sheet metal surface and skin-pass roll surface outside of the neutral point.

According to one embodiment of the method of the invention, the sheet steel after skin-pass rolling is additionally provided with process medium, preferably with oil, the process medium being applied with a surface weight of up to 2 g/m$^2$, more preferably with a surface weight of up to 0.4 g/m$^2$.

Specific embodiments of the invention are described in more detail below with reference to the drawing. The drawing and accompanying description of the resulting features should not be read as limiting on the respective embodiments, instead serving to illustrate exemplary embodiments. Moreover, the respective features may be utilized with one another and with features of the above description for possible further developments and improvements of the invention, especially in the case of additional embodiments which are not represented. Identical parts are always given the same reference symbols.

DESCRIPTION

Figure 1:
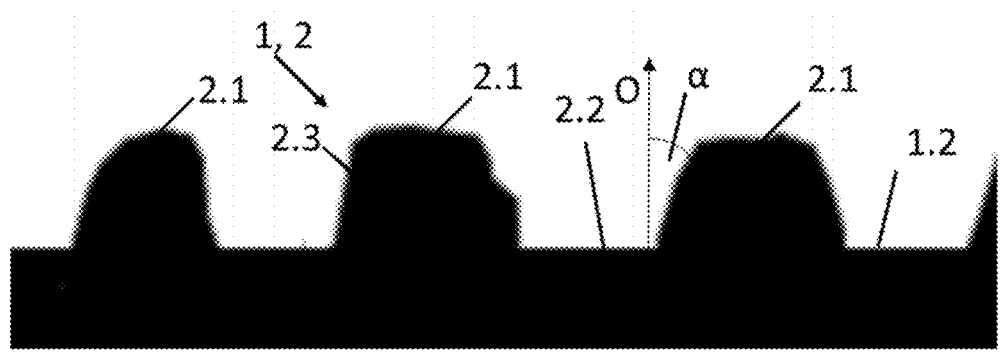
FIG. 1) shows a schematic view in partial section of an exemplary embodiment of the invention of a sheet steel coated with a zinc-based coating and skin-pass rolled with a deterministic surface structure, FIGS. 2a) and 2b) show a schematic view in partial section of a surface structure on a coated and skin-pass rolled sheet steel in FIGS. 2a), and a surface structure as per FIG. 2a) in FIG. 2b), and FIG. 3) shows ToF-SIMS data for a section of a sheet steel coated with a zinc-based coating and skin-pass rolled with a deterministic surface structure, according to one exemplary embodiment of the invention.

FIG. 1) represents a schematic view in partial section of an exemplary embodiment of the invention of a sheet steel (1) coated with a zinc-based coating (1.2) and skin-pass rolled with a deterministic surface structure (2), the surface structure (2) having peak regions (2.1) and valley regions (2.2), which are connected to one another via flank regions (2.3). As well as zinc and unavoidable impurities, the coating (1.2) comprises additional elements such as aluminum with an amount of 0.1 up to 5 wt% and magnesium with an amount of 0.1 up to 5 wt%.

Depending on the method of material removal used to machine a corresponding skin-pass roll (not represented) for skin-pass rolling the coated sheet steel (1), the flank region (2.3) and the valley region (2.2) are established by means of the corresponding region (positive shape) on the skin-pass roll not represented. It is readily apparent in FIG. 1), furthermore, that the surface structure (2) has a flank region (2.3) which, starting from the surface or from the peak region (2.1), runs down to a valley region (2.2) and which is formed with an angle (a) between 1° and 89° to the perpendicular (O) of the sheet steel (1). The flank region (2.3) forming the surface structure (2) and running peripherally around it, together with the valley region (2.2) connected or bonded in one piece to the flank region (2.3), defines a closed volume of the surface structure (2) impressed into the sheet steel (1) by means of skin-pass rolling.

In accordance with the invention, the relative concentration of magnesium on the surface of the coating (1.2) in the valley regions (2.2) is lower than on the surface of the coating (1.2) in the peak regions (2.1).

Figure 2:
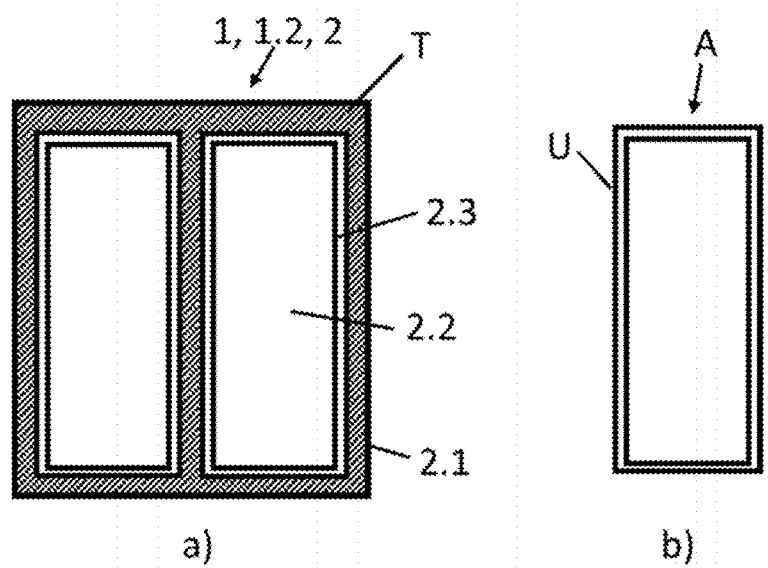

FIG. 2a) shows a schematic view in partial section of a deterministic surface structure, in the form of a double-I shape on a coated and skin-pass rolled sheet steel (1). The surface structure may be skin-pass rolled preferably by means of a laser-structured skin-pass roll (not represented); cf. EP 2 892 663 B1. The material ratio is less than 30%, with the material ratio reflecting the ratio of the areas of the peak regions (2.1) or the area of the peak region (2.1), dashed area of the material ratio (T), to the areas of the valley regions (2.2). FIG. 2b) shows only an I-shaped structure as an example, which can be impressed into a coated sheet steel (1). The factor F is greater than 1, expressing the ratio of skin-pass rolled area, corresponding for example to the area of the rectangle or square illustrated in FIG. 2a), minus the area of the material ratio (T), and the square of the area periphery (U); cf. FIG. 2b).

Figure 3:
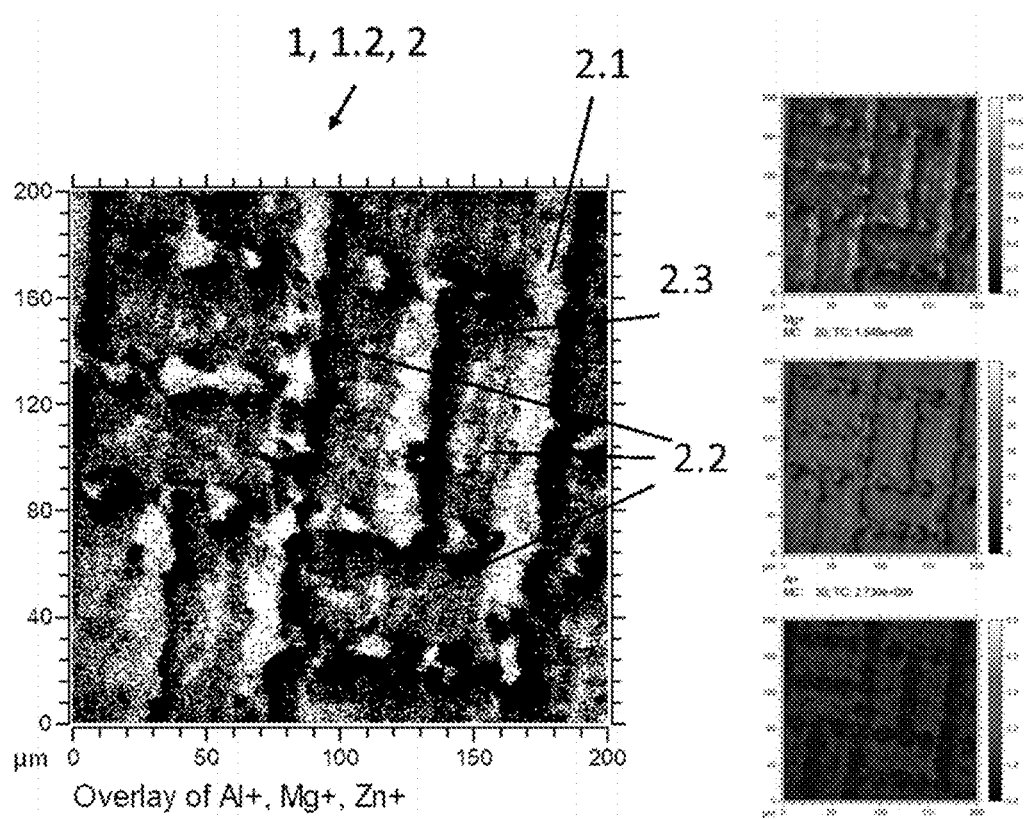

A deterministic surface structure was studied using the example of a constantly repeating I-shaped impression. Other embodiments are likewise conceivable and applicable and are not confined to an I-shaped impression. As well as zinc and unavoidable impurities, the zinc-based coating contained magnesium with an amount of 1.1 wt% and aluminum with an amount of 1.6 wt%. The thickness of the coating was established at 7 μm in the course of hot-dip coating on a steel sheet/strip 1.2 mm thick. The degree of skin-pass rolling was 0.8%. This skin-pass rolled sheet steel was studied more closely, in respect of the surface composition in particular. FIG. 3) shows ToF-SIMS data for a section of this skin-pass rolled steel sheet, in a high lateral resolution in a region of 200×200 μm, to characterize the chemical surface composition. Represented on the right are images of single-signal distributions of the alloy elements Mg, Al and Zn, and illustrated on the left is a superimposition of the individual signal distributions. It is readily apparent that magnesium-rich oxide layers have formed on the surface of the coating (1.2) in the course of the hot-dip coating operation. Because the peak regions (2.1) interact only insubstantially, if at all, with the shaping elements of a skin-pass roll and therefore are not subject to any substantial action of force, the magnesium-rich oxide layers are substantially retained on the surface, represented with light coloring, of the coating (1.2) in the peak regions or in the peak region (2.1); see FIG. 3, left-hand illustration. The situation is different for the relative concentration of magnesium in the valley regions (2.2) and in the flank regions (2.3). The relative concentration of magnesium (in metallic and/or oxidic form and/or hydroxidic form and/or as magnesium carbonate) present on the surface of the coating (1.2) in the valley regions (2.2) is lower than on the surface of the coating (1.2) in the peak regions (2.1) or in the flank regions (2.3). For example, the relative concentration of magnesium on the surface of the coating (1.2) in the valley regions (2.2) is at least 20% lower than on the surface of the coating (1.2) in the peak regions (2.1), more particularly at least 40%, preferably at least 40%, more preferably at least 90%.

The zinc(oxide) and/or aluminum(oxide) alloy elements situated directly beneath the magnesium-rich oxide layer reach the surface owing to the mechanical action of the shaping elements of the skin-pass roller, and so the relative concentration of zinc on the surface of the coating (1.2) in the valley regions (2.2) is greater than the relative concentration of zinc on the surface of the coating (1.2) in the peak regions (2.1). The relative concentration of zinc on the surface of the coating (1.2) in the valley regions (2.2) is at least 20% greater than the relative concentration of zinc on the surface of the coating (1.2) in the peak regions (2.1), more particularly at least 30%, preferably at least 40%, more preferably at least 50%. The relative concentration of magnesium, zinc and/or aluminum within the valley regions (2.2) can be influenced by the action of the shaping elements of the skin-pass roll, in particular as a function of the degree of skin-pass rolling, which can be between 0.5% and 2.5%.

For further studies, six coated, skin-pass rolled steel sheets (V1 to V6) were employed. The nature of the coating was chosen the same for all of the steel sheets: a zinc-based coating (zinc and unavoidable impurities) with a magnesium content of 1.6 wt% and an aluminum content of 1.1 wt%, which was applied in a hot-dip coating operation and had a thickness of around 7 μm. V1 to V3 were skin-pass rolled with a stochastic surface structure, and V4 to V6 with a deterministic surface structure, in the form of a repeating I-shape.

TABLE 1

| Steel sheet | Oil surface weight [g/m²] | Cup-drawing test | Degree of skin-pass rolling [%]/ Factor F [%] | Material ratio T [%] |
|---|---|---|---|---|
| V1 | 2 | ++ | 0.8/* | * |
| V2 | 1.5 | + | 0.9/* | * |
| V3 | 1 | 0 | 1.0/* | * |
| V4 | 1 | +++ | 0.8/>2 | <25 |
| V5 | 0.8 | ++ | 0.9/>2 | <20 |
| V6 | 0.6 | + | 1.0/>2 | <15 |

The data in table 1 relating to a strip-drawing test, a cup-drawing test according to DIN EN 1669, which was carried out under identical conditions for all six steel sheets V1 to V6, show essentially a positive outcome. For V1 to V3, it was not possible to determine the factor F and the material ratio, since a stochastic surface structure does not exhibit any reasonably detectable size and was therefore marked *. Evaluation was made according to the following criteria:

+++ means that no thinning was perceptible;
++ means that both the friction coefficient determined in the strip-drawing test and the thinning at the runout of the die edge on the formed steel sheet were lower (low thinning below 5% of the original steel sheet thickness),
+ means that the minimum thinning on the formed steel sheet was more than 5% but less than 10% of the original steel sheet thickness,
0 means that there was a marked, perceptible thinning without ruptures, but this thinning was no longer within the tolerable range (15% to 25% of the original steel sheet thickness).

As a result of the establishment—more particularly, targeted establishment—of the relative concentration of magnesium, and more particularly through the reduction in the magnesium-rich oxide layers on the surface of the coating in the valley regions, it was possible to reduce the surface weight of oil on the steel sheets V4 to V6, coated in accordance with the invention and skin-pass rolled with a deterministic surface structure, to below 1 g/m², the amount being sufficient to achieve an appropriately good outcome.

The invention claimed is:

1. A sheet steel coated with a zinc-based coating and skin-pass rolled with a deterministic surface structure, the surface structure having peak regions and valley regions which are connected to one another via flank regions, wherein the coating, as well as zinc and unavoidable impurities, comprises additional elements including aluminum with an amount of 0.1 up to 5 wt% and magnesium with an amount of 0.1 up to 5 wt% in the coating, the concentration of magnesium on the surface of the coating in the valley regions being lower than on the surface of the coating in the peak regions.

2. The sheet steel as claimed in claim 1, wherein the concentration of magnesium on the surface of the coating is at least 20% lower in the valley regions than in the peak regions.

3. The sheet steel as claimed in claim 2 wherein, the relative concentration of zinc on the surface of the coating in the valley regions is greater than the relative concentration of zinc on the surface of the coating in the peak regions.

4. The sheet steel as claimed in claim 3 wherein, the flank region is configured with an angle (α) of between 1° and 89° relative to a line perpendicular (O) to the sheet steel.

5. The sheet steel as claimed in claim 4 wherein the sheet steel has a material ratio of less than 50%.

6. The sheet steel as claimed in claim 5 wherein the sheet steel has a factor F greater than 1%.

7. The sheet steel as claimed in claim 6 wherein the sheet steel being additionally provided with a process medium (M), the process medium (M) in particular being taken up with a surface weight of up to 2 g/m² in the surface structure.

8. The sheet steel as claimed in claim 4 wherein, the sheet steel has a material ratio of less than 40%.

9. The sheet steel as claimed in claim 4 wherein, the sheet steel has a material ratio of less than 30%.

10. The sheet steel as claimed in claim 4 wherein, the sheet steel has a material ratio of less than 25%.

11. The sheet steel as claimed in claim 4 wherein, the sheet steel has a material ratio of less than 20%.

12. The sheet steel as claimed in claim 1, wherein the concentration of magnesium on the surface of the coating is at least 40% lower in the valley regions than in the peak regions.

13. The sheet steel as claimed in claim 1, the relative concentration of magnesium on the surface of the coating being at least 60% lower in the valley regions than in the peak regions.

14. The sheet steel as claimed in claim 1, the relative concentration of magnesium on the surface of the coating being at least 90% lower in the valley regions than in the peak regions.

15. A method for producing a sheet steel coated with a zinc-based coating and skin-pass rolled with a deterministic surface structure, comprising the following steps:
providing a sheet steel coated with a zinc-based coating, the coating, as well as zinc and unavoidable impurities, comprising additional elements including aluminum with an amount of 0.1 up to 5 wt% and magnesium with an amount of 0.1 up to 5 wt% in the coating, and
skin-pass rolling the coated sheet steel with a skin-pass roll, where the surface of the skin-pass roll which acts on the surface of the sheet steel is furnished with a deterministic surface structure such that after the skin-pass rolling, the surface structure of the coated and rolled sheet steel has peak regions and valley regions which are connected to one another via flank regions, and the exposure to the skin-pass roll establishes a concentration of magnesium on the surface of the coating in the valley regions which is lower than on the surface of the coating in the peak regions.

16. The method as claimed in claim 15, wherein the degree of skin-pass rolling is at least 0.5%.

17. The method as claimed in claim 16, wherein the sheet steel is additionally provided with a process medium (M), the process medium (M) being applied with a surface weight of up to 2 $g/m^2$.

* * * * *

UNITED STATES PATENT AND TRADEMARK OFFICE
CERTIFICATE OF CORRECTION

| | | |
|---|---|---|
| PATENT NO. | : 11,905,579 B1 | Page 1 of 1 |
| APPLICATION NO. | : 17/763308 | |
| DATED | : February 20, 2024 | |
| INVENTOR(S) | : Fabian Junge et al. | |

It is certified that error appears in the above-identified patent and that said Letters Patent is hereby corrected as shown below:

On the Title Page

Item (86) Parent Application Number should be listed as:
- PCT/EP2020/076422 -

Signed and Sealed this
Eleventh Day of June, 2024

Katherine Kelly Vidal
*Director of the United States Patent and Trademark Office*